United States Patent [19]

Hall et al.

[11] Patent Number: 5,153,058
[45] Date of Patent: Oct. 6, 1992

[54] FIBER REINFORCED THERMOPLASTIC COMPOSITES AS FIRE/HEAT BARRIERS FOR COMBUSTIBLE SUBSTRATES

[75] Inventors: Walter L. Hall; Erich O. Teutsch, both of Pittsfield, Mass.

[73] Assignee: General Electric Company, Pittsfield, Mass.

[21] Appl. No.: 350,654

[22] Filed: May 11, 1989

[51] Int. Cl.$^5$ ............................................. B29C 67/14
[52] U.S. Cl. .................................. 428/319.7; 428/113; 428/119; 428/286; 428/318.4; 428/319.3; 428/326; 428/327; 428/478.4; 428/537.1; 428/920; 428/921; 428/476.6
[58] Field of Search ............ 428/326, 327, 464, 478.4, 428/476.6, 537.1, 113, 119, 920, 921, 304, 318.4, 319.3, 319.7, 284

[56] References Cited

U.S. PATENT DOCUMENTS

| | | | |
|---|---|---|---|
| 3,716,449 | 2/1973 | Gatward et al. | 162/101 |
| 4,044,188 | 8/1977 | Segal | 428/283 |
| 4,135,029 | 1/1979 | Pfeffer | 428/284 |
| 4,238,266 | 12/1980 | Steinberg et al. | 156/243 |
| 4,522,875 | 6/1985 | Still, Jr. et al. | 428/285 |
| 4,643,940 | 2/1987 | Shaw et al. | 428/325 |
| 4,690,860 | 9/1987 | Radvan et al. | 428/290 |
| 4,695,501 | 9/1987 | Robinson | 428/319.3 |
| 4,716,072 | 12/1987 | Kim | 428/212 |
| 4,729,916 | 3/1988 | Feldman | 428/920 |

FOREIGN PATENT DOCUMENTS

| | | |
|---|---|---|
| 0148760 | 7/1985 | European Pat. Off. . |
| 0148761 | 7/1985 | European Pat. Off. . |
| 0148762 | 7/1985 | European Pat. Off. . |
| 0148763 | 7/1985 | European Pat. Off. . |
| 0152994 | 12/1987 | European Pat. Off. . |
| 1129757 | 10/1968 | United Kingdom . |
| 1329409 | 6/1973 | United Kingdom . |
| 1395757 | 5/1975 | United Kingdom . |
| 1397378 | 6/1975 | United Kingdom . |

*Primary Examiner*—Patrick J. Ryan
*Assistant Examiner*—Richard Weisberger
*Attorney, Agent, or Firm*—Edward A. Hedman

[57] ABSTRACT

A fire resistant structure has a compressed fiber reinforced composite layer and a wooden substrate layer. The composite layer upon exposure to fire provides a lofted glass network which acts as a barrier to heat and fire thereby protecting the underlying substrate layer.

12 Claims, No Drawings

FIBER REINFORCED THERMOPLASTIC COMPOSITES AS FIRE/HEAT BARRIERS FOR COMBUSTIBLE SUBSTRATES

BACKGROUND OF THE INVENTION

1. Field of the Invention

The present invention relates to fire resistant structures, and more particularly relates to multilayered structures having a fiber reinforced protective layer and a protected substrate layer.

2. Description of Related Art

Structural materials such as sheets of wood, plywood, particle board, and oriented strand board find wide spread use in the building industry. Each of these materials, while providing desired levels of strength and economy, have, however, generally exhibited undesirably low levels of heat and fire resistance.

Accordingly, one object of the present invention is to provide wooden structures which exhibit desired levels of heat and fire resistance.

SUMMARY OF THE INVENTION

The present invention provides a fire resistant structure having a compressed fiber reinforced composite layer and a wooden substrate.

DETAILED DESCRIPTION OF THE INVENTION

The fire resistant structures of the present invention have a compressed, fire resistant composite layer and a protected wooden substrate layer.

The fire resistant composite layer has respective amounts of (i) fire resistant fibers and (ii) a binder material.

The fire resistant fibers are preferably in the form of single discrete fibers and preferably have a high modulus of elasticity. The fire resistant fibers preferably neither melt nor lose their high modulus of elasticity at temperatures below 400° C., and more preferably 600° C. Suitable fibers include glass, carbon, mineral and ceramic fibers and certain polymeric fibers such as aramid fibers sold under the trade names Kevlar and Nomex. Preferably, the fibers have a modulus of elasticity higher than 10,000 Mega Pascals.

Suitable fibers have at least 50% by weight fiber strands having a length between about 0.125 inch and about 1.0 inch, more preferably between 0.125 and 0.5 inch, and most preferably about 0.5 inch. The fibers preferably have an average diameter of from between 2 microns and 30 microns, more preferably between 12 microns and 23 microns and most preferably about 16 microns. Fiber length is important in providing the desired level of lofting in structure upon exposure to heat. Fibers which are either too long or too short provide inadequate levels of lofting. Fiber diameters are important in providing the desired levels of fiber stiffness. Fibers which are too thin lack the desired levels of stiffness for lofting and fibers which are too thick are also generally too stiff and break during compression.

The binder material is preferably an organic material and may be selected from resins including both thermoplastics and thermosets. The binder material upon consolidation forms a solid matrix which serves to bond the fibers together in the composite layer. The binder preferably is a thermoplastic material.

Suitable thermoplastic materials for forming a binder matrix include polyolefins, polyesters, polyamides, polyethers, polycarbonates, acrylonitrile styrene-butadiene copolymer, polyvinylchloride, and polystyrenes.

Suitable polyolefins include a polymerization product of at least one aliphatic ethyleneically unsaturated monomer and is selected from polyethylene and other polyolefins and copolymers of such monomers, for example, polyethylene, polybutene, polypropylene, polypentene, poly(methylpentene), normally solid copolymer of ethylene and butene-1, copolymers of ethylene and ethyl acrylate, or vinyl acetate, butadiene-acrylonitrile copolymers, ionomers, poly(methyl methacrylate), polyisobutylene rubbers and the like, poly(vinyl chloride), poly(vinylidene chloride), a copolymer of vinyl chloride with vinyl acetate, natural rubber, a rubbery copolymer of butene-1 and ethylene, a rubbery copolymer of butadiene and acrylonitrile, and the like. All such polymers are commercially available or can be prepared by techniques well known to those skilled in the art. As to the copolymers and terpolymers, the proportions of the repeating units may vary broadly and will be selected to provide the desired characteristics, i.e., normally rubbery, normally solid, and the like. In addition to the polymers illustrated above, other suitable polymerization products of aliphatic ethyleneically unsaturated monomers include derivatives thereof, such as halogenated hydrocarbon polymers, e.g., chlorinated polyethylene, chlorosulfonated polyhydrocarbons and polymerized carboxy-substituted butadiene and the like.

Other preferred thermoplastics are selected from polyacetal homopolymers, such as polyoxymethylene, polyacetal copolymers, such as those based on trioxane, polyphenylene ethers, such as poly(2,6-dimethyl-1,4-phenylene)ether, polysulfones, such as the condensation product of bisphenol A and 4,4'-dichlorodiphenyl sulfone, polyamides, such as polycaprolactam, or the product of hexamethylenediamine and adipic acid, polyimides, e.g., the product of bismaleimido diphenyl methane and methylene dianiline, normally solid or normally rubbery polyorganosiloxanes, such as polyalkyl or arylsiloxanes, or combinations of the two, and copolymers of polyorganosiloxanes with vinyl aromatics, e.g., styrene, acrylic monomers, e.g., methyl methacrylate, or aromatic esters, e.g., the reaction products of bisphenol A and iso or terephthaloyl chloride, as well as siloxane-nitrogen copolymers containing amido, amide-imido and imide groups. All such polymers are either commercially available or can be made in ways known to those skilled in the art.

Also preferred are thermoplastics which comprise mixtures of any of the above-mentioned thermoplastics. For example, one such mixture would comprise a high molecular weight composition which is a combination of polystyrene or other styrene resin, including rubber modified polystyrenes (i) with a condensation product of 2,6-dimethylphenol, i.e., poly(2,6-dimethyl-1,4-phenylene)ether.

Typical of the polyester resins suitable for this invention are poly(alkylene terephthalates, isophthalates or mixed terephthalates and isophthalates), wherein the alkylene groups contain from 2 to 10 carbon atoms. They are available commercially or can be prepared by known techniques, such as by the alcoholysis of esters of the phthalic acid with a glycol and subsequent polymerization, by heating glycols with the free acids or with halide derivatives thereof, and similar processes.

These are described in U.S. Pat. Nos. 2,465,319 and 3,047,539 and elsewhere.

Although the glycol portion of such typical polyesters can contain from 2 to 10 carbon atoms, e.g., 1,2 ethylene, 1,3-propylene, 1,4-butylene, 1,3-butylene, 1,2-propylene, 1,2-butylene, 2,3-butylene, 1,6-hexylene, 1,10-decylene, etc., it is preferred that it contain 2 or 4 carbon atoms, in the form of linear methylene chains.

Preferred polyesters will be of the family consisting of high molecular weight, polymeric 1,4-butylene glycol terephthalates or isophthalates having repeating units of the general formula:

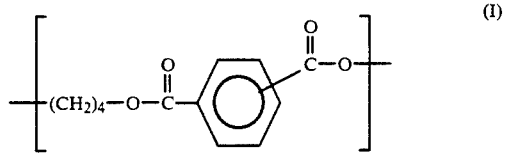

(I)

and mixtures of such esters, including copolyesters of terephthalic and up to about 30% isophthalic acids.

Especially preferred polyesters are polyethyleneterephthalate, poly(1,4-butylene 70/30 isoterephthalate) and poly(1,4-butylene terephthalate). Special mention is made of the latter because it is easy to prepare from readily available materials and crystallizes at an especially rapid rate.

Illustratively, sufficiently high molecular weight polyesters of the preferred type will have an intrinsic viscosity of at least 0.2 and preferably about 0.4 deciliters/gram as measured in o-chlorophenol, a 60/40 phenol-tetrachloroethane mixture or a similar solvent at 25°–30° C. The upper limit is not critical, but will generally be about 1.5 dl./g. Especially preferred polyesters will have an intrinsic viscosity in the range 0.5 to 1.3.

Suitable aromatic polycarbonate resins are the polymers derived from a bivalent phenol and a carbonate pre-product, for example phosgene, a halogen formate or a carbonate ester. The aromatic polycarbonate resins preferably possess an intrinsic viscosity of approximately 0.35–0.75 (measured in p-dioxane at 30° C. and expressed in deciliters per gram0. Suitable bivalent phenols which may be used for the preparation of these aromatic polycarbonate resins are mononucleus and multinuclei aromatic compounds which comprise 2-hydroxyl groups as functional groups which are both directly bonded to a carbon atom of an aromatic nucleus. Examples of suitable bivalent phenols are: 2,2-bis(4-hydroxyphenyl) propane (Bisphenol A=BPA), resorcinol; bis(4-hydroxy-5-nitrophenyl) methane; 2,2'-dihydroxydiphenyl; 2,6-dihydroxynaphthalene; bis-(4-hydroxy-phenylsulfone); 5'-chloro-2,4'-dihydroxyldiphenyl sulphone; 4,4'-dihydroxydiphenyl ether, and 4,4'-dihydroxy-2,5-diethoxydiphenyl ether.

In preparing the aromatic polycarbonate resins it is possible to use two or more different bivalent phenols or a copolymer of a bivalent phenol with a glycol or with a polyester with hydroxy group or acid terminal group. The aromatic polycarbonate resin may also be prepared in the presence of a dibasic acid. Crosslinked polycarbonate resins as described in U.S. Pat. No. 4,001,184 are also suitable. It is also possible to use a mixture of two or more of the above-mentioned polycarbonate resins. The homopolymer derived from bis-phenol A is preferably used as a polycarbonate resin.

Upon exposure to heat and flames, the binder material burns, decomposes or experiences reduced viscosity resulting in the release of the fiber web allowing the web to loft. Generally, the longer the fiber length for randomly dispersed glass fibers the greater the web will loft and the greater the web will protect the substrate. In other words, the longer the fibers in a randomly dispersed compressed fiber system, the greater the degree of loft obtained upon decompression. The compressed composite layers are made by the binder material and fibers being randomly dispersed to form an unconsolidated, lofted web, which is then consolidated by heat and pressure into a solid continuous form. The pressure causes the fibers to be compressed, and the heat, in the case of thermoplastic binder materials, serves to melt the thermoplastic which then flows around the fibers and upon cooling forms a solid matrix which locks the fibers into a compressed state. Suitable compressed composite layers are set forth in European Patent Application 0,148,761 filed Jan. 3, 1985 and published Jul. 17, 1985.

As mentioned above, the preferred binder materials are thermoplastics. Preferably the thermoplastic is, prior to dispersion and consolidation, in the form of a fine powder or particulate. The plastics may also be in a needle or fibrous form prior to dispersion and consolidation. The fibers and thermoplastic powder or particulates can be randomly dispersed to form a lofted web by any of various well known dispersion processes including dry blending, aqueous dispersion, latex dispersion and foam dispersion processes. Suitable processes are set forth in United Kingdom Patent 1,129,757, United Kingdom Patent 1,329,409, European Patent Application 0,148,760, European Patent Application 0,148,761, U.S. Pat. No. 4,426,470, and U.S. Pat. No. 3,716,449, all of which are incorporated herein by reference. Extrusion processes involving the mixing of fibers and thermoplastics are generally not suitable in that they lead to substantial breakage of the fibers resulting in fibers of insufficient length for the desired level of lofting. The above dispersion processes result in the formation of a web of randomly dispersed fibers in thermoplastic powder. The web is initially an unconsolidated web which is in a generally uncompressed state, lofted, and in the form of a mat. Defining the unconsolidated web as being in a generally X, Y plane, the randomly dispersed fibers generally have degrees of orientations in each of the X, Y and Z direction, the Z direction being perpendicular to the XY plane. While the fibers may be primarily oriented in the XY plane they generally have some degree of orientation in the Z direction. Having a degree of orientation in the Z direction can facilitate the fibers being in a lofted state giving the web an initial unconsolidated thickness and a relatively low volume fraction of glass. Upon being compressed to a compressed state, the fibers will, due to their high modulus of elasticity, exert forces in the Z direction in an effort to return the web to its initial unconsolidated thickness. Thus, when the unconsolidated web is heated and compressed and then cooled, the binder matrix upon solidification holds the compressed fibers in a compressed state thereby providing a relatively thin compressed composite layer. Later upon exposure of the composite layer to high levels of heat or flames, the binder matrix melts or burns allowing the fibers to loft in the Z direction thereby forming a thick lofted web of heat resistant fibers which act as a heat and fire barrier for the underlying substrate.

It is also believed that the lofted heat resistant fiber web provides reduced oxygen access to the underlying substrate thereby reducing the substrate's tendency to burn. Additionally, it is believed that the lofted fiber web provides for more complete combustion of hydrocarbons passing therethrough resulting in reduced smoke levels during burning of the structure as compared to burning of an unprotected substrate.

Substrate layers for the structures of the present invention include wood substrates and plastic foam substrates.

The wood substrate layers may be any wood based material. Specifically, preferred wood based materials include solid wood, for example pine, oak, cedar and fir boards, particle board, oriented strandboard, flakeboard and plywood. These wood products are well known in the building industry.

Plastic substrate layers employed in the building industry include various insulative polymer foams including polystyrene foams and polyethylene foams, polypropylene foams, polyurethane foams and crosslinked polyethylene foams.

Both the wood substrate layers and the plastic foam substrate layers need protection from heat and flames.

The structures have a composite layer attached to a substrate layer. Suitable means for attaching the composite layer to the substrate layer include mechanical attachments such as clamps, screws, nails, brackets, frames and staples; and chemical adhesives such as thermoset and thermoplastic bonding agents including glues and epoxies. The chemical adhesives are preferred.

Unconsolidated webs prior to consolidation have a desired glass density which is defined as the amount of glass per unit volume of unconsolidated web. Preferably the glass density is from 0.03 g/cm$^3$ to 1.5 g/cm$^3$; more preferably from 0.05 g/cm$^3$ to 0.09 g/cm$^3$, and most preferably about 0.07 g/cm$^3$; and preferably the unconsolidated webs have a thickness of from 0.2 inch to 5 inches, more preferably from 0.5 inch to 2 inches, and most preferably about 1 inch. These parameters assist in assuring that the compressed composite layer will provide the desired level of lofting upon exposure to heat and fire.

Compressed composite layers preferably have from 35% to 98% by weight fibers based on the total weight of the composite layer, more preferably from 40% to 80% by weight thereof, and most preferably about 50% by weight thereof; preferably from 2% to 65% binder material based on the total weight of the composite layer; more preferably from 20% to 60% by weight thereof; and most preferably about 50% by weight thereof. The compressed composite layer preferably has a thickness of from 0.015 inch to 0.50 inch, more preferably from 0.04 inch to 0.25 inch, and most preferably about 0.08 inch. The compressed composite layer is characterized as having a thickness of less than 50% of the original thickness of the unconsolidated web, and more preferably has a thickness of less than 25% thereof, and most preferably from 4% to 20% thereof. The compressed layer upon exposure to excessive heat or flames will loft to a lofted web thickness which is preferably at least double the thickness of the original compressed composite layer and which approaches the thickness of the original unconsolidated web. This lofting phenomenon allows the compressed composite layer to be thin but upon exposure to fire allows the fire resistant fiber web of the compressed layer to expand to a lofted thickness which will provide adequate protection to the underlying substrate layer. It is preferred that the fiber web of the compressed layer expands to a lofted thickness of from 0.25 inch to 3 inches upon exposure to excessive heat or flames depending upon the desired level of protection desired. The excessive heat or flames cause the binder matrix to release the compressed fibers allowing the web to loft. The binder matrix will release the fibers when either (i) the binder material reaches a sufficiently high temperature that its viscosity is reduced to a level low enough to allow the compressed fibers to overcome the resistance of the binder material and thereby expand to a lofted thickness or (ii) the binder material is sufficiently degraded or burned to allow the matrix to release the fibers and allow the web to expand to to release the fibers and allow the web to expand to a lofted thickness.

The composite layers preferably have a low level of fuel content therein to minimize the heat generated during burning of the binder matrix. Fuel content may be minimized by employing a minimum amount of binder material in the composite. As noted above, preferably the binder material is present at a level of from 2% to 65% by weight based on the total weight of the composite layer, more preferably from 20% to 60% by weight thereof, and most preferably about 50% by weight thereof; in addition to minimizing fuel content in the composite layer, it is also desired to maximize the degree of lofting achieved by compressed composite layer upon exposure to heat and flames so that the thickness of the lofted fire resistant fiber web is maximized to thereby provide maximum protection to the underlying substrate. Lofting can be maximized by maximizing the fiber loading in a structure. Preferably the fiber is present in the composite layer at a concentration of from 35% to 98% by weight based on the total weight of the composite layer, more preferably from 40% to 80% by weight thereof, and most preferably about 50% by weight thereof.

The composite layers may also contain from 1% to 25% by weight mineral fillers based on the total weight of the composite layer. Suitable mineral fillers include titanium oxides.

Preferred structures include compressed composite layer adhered to a wooden substrate layer; compressed composite layer adhered to a wooden substrate layer which is adhered to an insulative foam layer; and compressed composite layer adhered to an insulative foam layer. Other preferred structures include having a wooden substrate layer disposed between at least two compressed composite layers; and an inner unit having insulative foam layer disposed between at least two layers of wood which wherein the unit is disposed between at least two compressed composite layers.

Another suitable structure has a unit having a foam layer disposed between a pair of wooden substrates wherein a composite layer is adhered to a surface of the unit.

Additionally, the structures may employ more than one composite layer.

The wooden substrate layers will preferably have a thickness of from 0.10 inch to 3.0 inches, more preferably from 0.20 inch to 2.0 inches, and most preferably from 0.20 inch to 1.0 inch. The foam substrate layers will preferably have thicknesses of from 0.25 inch to 8.0 inches.

The structures of the present invention are useful as interior and exterior building materials including usefulness as roofing, siding, walls, floors, ceilings, etc.

EXAMPLES

The following examples illustrate the present invention but are not meant to limit the scope thereof.

EXAMPLES 1-5

Examples 1-5 illustrate the lofted web thickness obtained after exposing a 0.055 inch thick compressed composite layer to a temperature of 550° F. The compressed composite layers had 50 weight percent glass fibers and 50 weight percent polybutylene terephthalate. The glass fibers had diameters of 16 microns.

| Example | Length of Fibers (inches) | Lofted Thickness(mm) |
|---|---|---|
| 1 | 0.0625 | 2.5 |
| 2 | 0.125 | 4.5 |
| 3 | 0.250 | 6.6 |
| 4 | 0.50 | 8.4 |
| 5 | 1.0 | 7.6 |

An important test in the building industry involves applying a controlled flame to one side of a sheet material, for example a plywood sheet, and measuring the time that it takes for the temperature at the back side of the sheet to reach a given temperature, for example 160° C. Such tests are particularly useful when it is desired to protect certain materials such as insulative foams from temperatures in excess of 160° C. Standard tests include UBC (Unified Building Code) 17-3. The following examples used a simplified test which in practice has corresponded well with the UBC 17-3 test. The test employed in the following examples involved holding the structures horizontally over a vertical flame. The structures employed were 5"×5" square in dimensions and were located 4.25 inches above the base of the flame. The flame was generated using a Fischer burner and a constant methane rate throughout the tests. The composite layer was adhered to the substrate layer by phenol/formaldehyde resin glue. During testing the composite layer was located between the substrate layer and the flame. Thermocouples were placed on the back side of the substrate layer and in between the substrate layer and composite layer to measure the temperatures at those locations during the test. The tests were conducted in a chamber to control conditions surrounding the test.

The following structures employed a 0.055 inch thick compressed composite layer which was 50% by weight glass fibers having a diameter of 16 microns and having in general lengths of about 0.50 inch; and which was 50% by weight of polybutylene terephthalate thermoplastic binder material. The compressed composite layers were produced by a foam dispersion process according to Gatward, et. al., U.S. Pat. No. 3,716,449, wherein a lofted randomly oriented fiber web in the thermoplastic powder was obtained, the web was then consolidated by applying heat and pressure thereto, and was then cooled under pressure to allow the thermoplastic matrix to solidify around the fibers and hold the fibers in their compressed state. The lofted web, prior to consolidation, had a thickness of about 1 inch. Various substrates were protected by the compressed composite layers and the following examples illustrate the degree of protection provided by the compressed composite layers of the present invention.

| Examples | Substrate Material[a] | Time w/o Composite[b] | Time with Composite[c] |
|---|---|---|---|
| 6 | Polystyrene Foam | ≈0 minutes | 3.6 minutes |
| 7 | Cardboard | .6 minutes | 5.1 minutes |
| 8 | Polyurethane Foam | .3 minutes | 4.0 minutes |
| 9 | Polycarbonate Sheet | 1.8 minutes | 7.3 minutes |
| 10 | White Pine | 3.6 minutes | 10.8 mintues |

[a]Substrate materials were 0.25 inch in thickness.
[b]Time without the composite layer is the time that it took for the back side of the substrate material to reach 160° C. without the presence of a protective composite layer.
[c]Time with the composite layer is the time that it took for the back side of the substrate material to reach 160° C. with a protective composite layer adhered to the substrate material and located between the substrate material and the flame.

Examples 11 to 15 illustrate the degree of protection obtained by compressed composites employing 50% by weight polybutylene terephthalate as the binder matrix based on the total weight of the composite layer and 50% by weight glass fibers based on the total weight of the composite layer. The glass fibers had a diameter of 16 microns. The structures employed had the 0.055 inch thick composite layer adhered to a 0.25 inch thick oriented strand board substrate layer. The following examples set forth the time for the backside of the structure to reach 160° C. after initiation of exposure of the structure to the flame. The compressed composite layer was located between the flame and the strandboard substrate layer.

Examples 16 to 20 illustrate for various glass fiber lengths the temperature between the composite layer and the substrate layer at 6 minutes after the initiation of the burn test. The structures of examples 16 to 20 are similar to the structures of examples 11 to 15.

EXAMPLES 11-15

Examples 11-15 illustrate that fiber lengths of 0.5 inch provide compressed composites which provide the greatest degree of protection to substrate.

| Example | Glass Fiber Length | Time (minutes) |
|---|---|---|
| 11 | 0.0625 inch | 6.2 |
| 12 | 0.125 inch | 8.7 |
| 13 | 0.250 inch | 8.1 |
| 14 | 0.50 inch | 9.0 |
| 15 | 1.0 inch | 8.4 |

EXAMPLES 16-20

Examples 16-20 illustrate the temperature between the composite layer and the substrate layer at time 6 minutes, and illustrate the relationship between fiber length (and thus degree of loft) and protection of the underlying substrate.

| Example | Glass Fiber Length | Temperature (°C.) |
|---|---|---|
| 16 | 0.0625 inch | 487 |
| 17 | 0.125 inch | 399 |
| 18 | 0.250 inch | 370 |
| 19 | 0.50 inch | 346 |
| 20 | 1.0 inch | 340 |

What is claimed:
1. A multilayered fire and heat barrier for combustible substrates comprising:
   (a) a compressed fiber reinforced composite layer, said composite layer having from 40% to 80% by weight loftable glass fiber based on the total weight of said composite layer, said composite layer having from 20% to 60% by weight of a thermoplastic polymer material, said fibers being held in a compressed state by a solid matrix of said thermoplastic material, said fibers having an average length of from between 0.125 inch and 1.0 inch randomly arranged in an X, Y and Z direction, the Z direction being perpendicular to the XY plane; and (b) a substrate layer attached to said composite layer, said substrate layer being a wooden substrate layer.

2. The barrier of claim 1, wherein said composite layer has a thickness of from about 0.015 inch to about 0.5 inch.

3. The barrier of claim 2, wherein said composite layer is characterized by having been consolidated under pressure and heat from an unconsolidated web of said glass fibers and thermoplastic material, said unconsolidated web having had a thickness of from 0.5 inch to 5 inches.

4. The barrier of claim 1, wherein at least 50% by weight of said glass fibers have a length of from 0.125 inch and 0.5 inch.

5. The barrier of claim 1, wherein said thermoplastic material is selected from the group consisting of polypropylene, polyethylene, polybutylene terephthalate, polyamide and polyethylene terephthalate.

6. The barrier of claim 4, wherein said fibers have a thickness of from between 2 microns and 30 microns.

7. The barrier of claim 1, wherein said substrate layer is selected from the group consisting of solid wood, plywood, particle board, flakeboard, strandboard, and oriented strand board.

8. The barrier of claim 1, further comprising a solid structural insulative foam layer.

9. The barrier of claim 8, wherein said foam layer is a polystyrene foam.

10. A multilayer fire and heat barrier for combustible substrates comprising:

(a) a wooden substrate layer; and (b) a compressed composite layer having a thickness of from 0.015 inch to 0.5 inch, said compressed composite layer being obtained from compressing under heat an unconsolidated web of:

(i) thermoplastic binder material; and (ii) loftable fire resistant fibers randomly arranged in a X, Y and Z direction, where the Z direction is perpendicular to the XY plane and having an average length of from between 0.125 inch and 1.0 inch, said compressed composite layer having a thickness of less than 50% of the thickness of the unconsolidated web, said compressed composite layer having a solid matrix of said thermoplastic binder material which hold fibers in a compressed state.

11. The barrier of claim 10 wherein said composite layer upon exposure to a temperature of 400° C. lofts to form a lofted web having a thickness of at least twice the thickness of said composite layer.

12. A multilayered fire and heat barrier for combustible substrates comprising:

(a) a compressed fiber reinforced composite layer, said composite layer having from 40% to 80% by weight loftable glass fiber based on the total weight of said composite layer, said composite layer having from 20% to 60% by weight of a thermoplastic polymer material, said fibers being held in a compressed state by a solid matrix of said thermoplastic material, said fibers having an average length of from between 0.125 inch and 1.0 inch randomly arranged in an X, Y and Z direction where the Z direction is perpendicular to the XY plane; and (b) a substrate layer attached to said composite layer by a chemical adhesive, said substrate layer being a wooden substrate layer.

* * * * *